US007752877B2

(12) United States Patent
Burns

(10) Patent No.: US 7,752,877 B2
(45) Date of Patent: Jul. 13, 2010

(54) ROTARY ACTUATION LATCH WITH DISCONNECT FEATURE

(75) Inventor: Sean T. Burns, Lexington, SC (US)

(73) Assignee: Hanson International, Inc., Lexington, SC (US)

( * ) Notice: Subject to any disclaimer, the term of this patent is extended or adjusted under 35 U.S.C. 154(b) by 465 days.

(21) Appl. No.: 11/682,463

(22) Filed: Mar. 6, 2007

(65) Prior Publication Data

US 2008/0216527 A1 Sep. 11, 2008

(51) Int. Cl.
*B60R 25/02* (2006.01)

(52) U.S. Cl. .............. 70/208; 292/336.3; 292/DIG. 30; 292/DIG. 31

(58) Field of Classification Search ........... 70/208–211; 292/336.3, DIG. 30, DIG. 31
See application file for complete search history.

(56) References Cited

U.S. PATENT DOCUMENTS

| | | | | |
|---|---|---|---|---|
| 337,889 | A | | 3/1886 | Taylor |
| 2,534,693 | A | | 12/1950 | Adams |
| 2,715,243 | A | | 8/1955 | Koll |
| 3,668,907 | A | | 6/1972 | Pastva, Jr. |
| 3,707,862 | A | | 1/1973 | Pastva, Jr. |
| 3,871,198 | A | | 3/1975 | Miller |
| 4,138,869 | A | | 2/1979 | Pelcin |
| 4,309,884 | A | | 1/1982 | Davis |
| 4,312,202 | A | | 1/1982 | Pastva, Jr. et al. |
| 4,312,203 | A | | 1/1982 | Davis |
| 4,312,204 | A | | 1/1982 | Davis |
| 4,312,205 | A | | 1/1982 | Reed et al. |
| 4,320,642 | A | | 3/1982 | Pastva, Jr. |
| 4,321,812 | A | | 3/1982 | Pelcin |
| 4,335,595 | A | | 6/1982 | Swan et al. |
| 4,556,244 | A | | 12/1985 | Bisbing |
| 4,671,547 | A | | 6/1987 | Weinerman et al. |
| 4,706,478 | A | | 11/1987 | Swan et al. |
| 4,763,935 | A | | 8/1988 | Bisbing |
| 4,838,054 | A | * | 6/1989 | Weinerman et al. ........... 70/208 |
| 4,838,056 | A | | 6/1989 | Weinerman et al. |
| 4,841,755 | A | | 6/1989 | Weinerman et al. |
| 4,850,209 | A | | 7/1989 | Weinerman et al. |
| 5,012,553 | A | | 5/1991 | Hardigg et al. |
| 5,046,340 | A | | 9/1991 | Weinerman et al. |
| D323,970 | S | | 2/1992 | Schlack |
| 5,299,844 | A | | 4/1994 | Gleason |
| 5,409,272 | A | | 4/1995 | McCormack |
| 5,493,881 | A | | 2/1996 | Harvey |
| 5,526,660 | A | | 6/1996 | Bennett et al. |
| 5,586,458 | A | | 12/1996 | Weinerman et al. |
| 5,595,076 | A | | 1/1997 | Weinerman et al. |
| 5,611,224 | A | | 3/1997 | Weinerman et al. |
| D389,393 | S | | 1/1998 | Hansen |
| 5,887,927 | A | | 3/1999 | Kurek, III et al. |
| 5,913,908 | A | * | 6/1999 | Czipri ......................... 70/208 |
| 5,941,104 | A | | 8/1999 | Sadler |
| 5,984,383 | A | * | 11/1999 | Parikh et al. ................ 292/121 |
| 6,041,627 | A | | 3/2000 | Buckland |

(Continued)

*Primary Examiner*—Suzanne D Barrett
(74) *Attorney, Agent, or Firm*—Dority & Manning, P.A.

(57) ABSTRACT

According to certain aspects of the invention, rotary actuation latches are disclosed. The latches include a disconnect feature, so that when locked certain elements of the latches are deactivated. The disconnect feature may be operated by a locking device, such as a key lock or other device. The latch may be a rotary compression latch.

24 Claims, 11 Drawing Sheets

U.S. PATENT DOCUMENTS

| | | | | |
|---|---|---|---|---|
| 6,170,928 | B1 | 1/2001 | Eardley et al. | |
| RE37,518 | E | 1/2002 | Hardigg et al. | |
| 6,418,761 | B1 | 7/2002 | Wytcherley et al. | |
| 6,454,321 | B1 | 9/2002 | Parikh | |
| D464,906 | S | 10/2002 | Dudenhoeffer | |
| 6,460,902 | B1 * | 10/2002 | Kyle | 292/165 |
| D466,789 | S | 12/2002 | Jeffries | |
| D469,678 | S | 2/2003 | Teskey | |
| 6,513,353 | B1 | 2/2003 | Weinerman et al. | |
| 6,527,307 | B2 | 3/2003 | Welsh et al. | |
| 6,530,250 | B1 * | 3/2003 | Linares et al. | 70/208 |
| 6,532,778 | B2 * | 3/2003 | Molzer et al. | 70/208 |
| 6,568,226 | B1 | 5/2003 | Ramsauer | |
| 6,575,503 | B1 | 6/2003 | Johansson et al. | |
| 6,643,897 | B2 | 11/2003 | Chang | |
| 6,651,467 | B1 | 11/2003 | Weinerman et al. | |
| D484,024 | S | 12/2003 | Teskey et al. | |
| 6,666,053 | B2 | 12/2003 | Sadler | |
| 6,668,602 | B2 * | 12/2003 | Graham et al. | 70/208 |
| 6,708,537 | B1 | 3/2004 | Eschweiler et al. | |
| 6,854,774 | B2 | 2/2005 | Magnusson | |
| 6,952,940 | B2 * | 10/2005 | Molzer et al. | 70/210 |
| 6,953,209 | B2 | 10/2005 | Jackson, Jr. et al. | |
| 7,021,679 | B2 | 4/2006 | Magnusson | |
| 7,062,818 | B2 | 6/2006 | Jeffries | |
| 7,124,475 | B2 | 10/2006 | Jeffries | |
| D532,673 | S | 11/2006 | Weinerman et al. | |
| D532,675 | S | 11/2006 | Weinerman et al. | |
| D543,434 | S | 5/2007 | Weinerman et al. | |
| D548,560 | S | 8/2007 | Weinerman et al. | |
| 2004/0103701 | A1 | 6/2004 | Vickers | |
| 2005/0257582 | A1 * | 11/2005 | Minix | 70/208 |
| 2006/0028027 | A1 | 2/2006 | Schlack et al. | |

* cited by examiner

ROTARY ACTUATION LATCH WITH DISCONNECT FEATURE

FIELD OF THE INVENTION

The present invention relates generally to rotary actuation latches, whereby when the latch is locked, certain features of the latch may be intentionally disconnected to protect against impermissible entry and damage to the latch.

BACKGROUND

Various latches are operated via a rotatable handle member. For example, D-Ring and Folding-T handles have been in use for many years. In some such latches, a portion of the handle is first folded outward from a handle tray before rotating the handle. The handle in such case may include a shaft rotatable mounted on the tray. Rotation of the shaft via the handle typically moves elements on a back side of the tray to thereby effect the desired latching or unlatching. Often a latch (or pawl) mounted for rotation with the shaft will be put in place by rotation of the handle and shaft. Also, a rotating member can be provided on the back side of the tray to actuate remote latches via rods or the like.

Certain rotary latches are considered compression latches. In a compression latch, the pawl moves axially along a handle or lock shaft as well as rotationally around the axis of the shaft. Such motion may occur various ways—either sequentially axially and rotationally, or including a blend of both. Such axial motion in compression latches is useful in ensuring a tight closure and also allowing for a reduction or elimination of friction between the pawl and closure surface during rotational motion when rotating the shaft.

Rotary latches (both compression latches and others) may incorporate locks to prevent unauthorized opening of the compartments upon which they are mounted. Various designs and strategies have been employed with such locking rotary latches. For example, a padlock may be attached to the latch to prevent the handle from being lifted or rotated. Also, a key cylinder may be employed as part of the rotary shaft, or to hold in place the handle or various components. In previous devices, these locks prevented unauthorized opening by causing a frictional interference between elements—such as precluding the sliding or rotating of parts on the inside of the latch assemblies. At times, these rotary operated latches or their locks could be overcome by "brute force," such as use of a hammer or crowbar, to bend or break the latches at the point of interference, thereby allowing the latches to be opened. Also, locks or the shafts of rotary latches have been on occasion "drilled out" to overcome the lock.

Accordingly, a rotary operated latch with locking capabilities that addresses one or more of the drawbacks of previous latches or other goals would be welcome.

SUMMARY OF THE INVENTION

According to certain aspects of the invention, a rotary actuation latch with disconnect feature is disclosed, the latch including a tray for attachment to one of a door or a frame, the tray having a front side and a rear side, a rotary member rotatably mounted to and extending through the tray, the rotary member being movable along a longitudinal axis relative to the tray between a first position and a second position, a pawl disposed on the rear side of the tray for engaging the other of the door or the frame for securing the door in a closed position, the pawl having a drive interface disposable in either of a drive position or a disconnect position relative to the rotary member, the pawl being rotatable via the rotary member when the drive interface is in the drive position, and a locking device attached to the tray and movable between a locked position and an unlocked position. The locking device when in the locked position prevents the pawl drive interface from being disposable in the drive position while not preventing the rotary member from moving along the longitudinal axis between the first and second positions. Various options and modifications are possible.

For example, the pawl may be movable along the longitudinal axis when the pawl drive interface moves between the drive position and the disconnect position, and the pawl may be spaced further from the rear side of the tray when the pawl drive interface is in the drive position as compared to the disconnect position. A compression spring member may be disposed between the tray and the pawl for urging the pawl drive interface toward the drive position. The rotary member may include a shaft and a disconnector attached to the shaft, the disconnector including a drive interface for selectively engaging the drive interface of the pawl to rotate the pawl when the rotary member is disposed in the second position if the pawl drive interface is in the drive position. The compression spring member may comprise a first compression spring member, the latch further including a second compression spring member disposed between the tray and the disconnector for urging the disconnector away from the rear side of the tray.

A handle may be pivotally mounted to the rotary member on the front side of the tray, the handle movable between a first position and a second position to thereby move rotary member along the longitudinal axis between its respective first and second positions, the rotary member being rotatable via the handle when the handle is in the second position.

The pawl may include a stop interface for preventing rotation of the pawl when the handle is not in the second position. A stop interface may also be attached to the tray for selectively engaging the stop interface on the pawl when the handle is not in the second position.

The locking device includes a locking cylinder and a locking bar, the locking cylinder selectively positioning the locking bar between a locked position and an unlocked position. The locking bar may have a lock interface for preventing movement of the pawl drive interface from the disconnect position to the drive position when the locking bar is in the locked position. The pawl may have a lock interface for selective engagement by the locking bar lock interface.

The rotary member and the pawl may be configured to function as a compression latch. The pawl drive interface may be movable along the longitudinal axis between the drive position and the disconnect position, and the pawl drive interface may be spaced further from the rear side of the tray when in the drive position as compared to the disconnect position, a compression spring member being disposed between the tray and the pawl for urging the pawl drive interface toward the drive position. A handle may be pivotally mounted to the rotary member on the front side of the tray, the handle movable between a first position and a second position to thereby move rotary member along the longitudinal axis between its respective first and second positions, the rotary member being rotatable via the handle when the handle is in the second position.

According to certain other aspects of the invention, a rotary actuation latch with disconnect feature is disclosed, the latch including a tray for attachment to one of a door or a frame, the tray having a front side and a rear side, a handle assembly rotatably mounted to and extending through the tray, the handle assembly being movable along a longitudinal axis relative to the tray between a first position and a second position, a pawl disposed on the rear side of the tray for engaging the other of the door or the frame for securing the door in a closed position, the pawl being selectively connectable or disconnectable for rotation via the handle assembly, and a locking device attached to the tray and movable between a locked position and an unlocked position. The locking device when in the locked position disconnects the pawl from rotation via the handle assembly while not preventing the handle assembly from moving along the longitudinal axis between the first and second positions or from rotating around the longitudinal axis when in the second position. Again, various options and modifications are possible.

According to other aspects of the invention, a rotary actuation compression latch with disconnect feature is disclosed, the latch including a tray for attachment to one of a door or a frame, the tray having a front side and a rear side, a handle assembly rotatably mounted to and extending through the tray, the handle assembly being movable along a longitudinal axis relative to the tray between a first position and a second position, a pawl disposed on the rear side of the tray for engaging the other of the door or the frame for securing the door in a closed position, the pawl being rotatable via the handle assembly between a latched and an unlatched position, the handle assembly and pawl cooperating to provide a compression latching function along the longitudinal axis, a locking device attached to the tray and movable between a locked position and an unlocked position, and a means for disconnecting the pawl from rotation via the handle assembly while maintaining the compression latching function when the locking device is in the locked position. Various options and modifications are possible.

For example, the means for disconnecting may include a locking interface disposed on the locking device and the pawl for preventing the pawl from rotating with the handle assembly when the locking device is in the locked position. Or the pawl may be movable along the longitudinal axis, the locking interface precluding movement of the pawl along the longitudinal axis when the locking device is in the locked position. Also, the means for disconnecting may include a drive interface disposed on the pawl and the handle assembly engageable when the handle assembly in the second position and the locking device is in the unlocked position to thereby allow rotation of the pawl via the handle assembly. Also, a stop interface may be disposed on the pawl and attached to the tray for precluding rotation of the handle assembly when the handle assembly is in the first position.

DETAILED DESCRIPTION OF THE INVENTION

Figure 2:
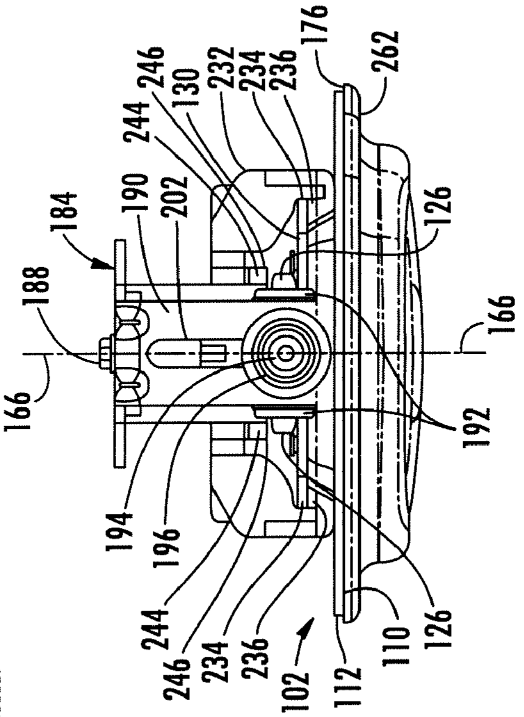
FIG. 2 is a top view of the latch of FIG. 1.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. In discussing various embodiments, like or similar reference numerals are used below with like or similar parts of various embodiments.

One example of a rotary actuation latch according to certain aspects of the invention is shown in FIGS. 1-15. As illustrated, latch 100 includes generally subparts such as a tray assembly 102, a handle assembly 104, a locking device assembly 106, and a pawl assembly 108. It should be understood that the subparts used herein are for identification and discussion only, and that individual elements of the latch could be considered to be part of one or more, or none, of such subparts. Further, various interactive portions of latch 100 may be located on more than one of such subparts. Therefore, no limitation is meant by way of such usage, and reference should be made to the claims and their permissible equivalents to discern the true scope of the inventive subject matter.

Tray assembly 102 may be said to include tray (sometimes called a pan) 110 and matching gasket 112. Tray 110 and gasket 112 have matching holes 114 for mounting latch 100 to a desired surface S1, such as a door mounted in a second surface S2. Alternatively, surface S1 could be a wall and surface S2 could be a door. Only portions of surfaces S1 and S2 are shown throughout the figures for clarity, but various it should be understood that various orientations could be employed.

A front shank 116 is disposed within an opening 118 in tray 110. Shank 116 and opening 118 have one or more mating portions 120 and 122 to prevent relative rotation once attached. Shank 116 is attached to tray 110 via threads 124 that mate with threads within locking nut 126. Lip 128 of shank 116 holds the shank in place once the nut is tightened over threads 124.

A locking bar plate 130 is attached to tray 110 via rivets 132. Locking bar plate 130 may be considered part of tray assembly 102 or locking device assembly 106, or both. Locking bar plate 130 includes an opening 134 sized to receive shank 116, and may include one or more mating portions 136 to interact with mating portions 120 to assist in holding the shank in place. Locking bar plate 130 has a tab 138 extending outwardly, the function of which will be described below.

Handle assembly 104 includes a handle 140 pivotally attached to a rotary member such as a shaft 142 via a rivet 144 or the like. Handle 140 as illustrated is formed generally in a loop, but various other shaped could be provided, such as a D-shape, a T-shape, an L-shape, etc. Therefore, no limitation is meant as to the shape of handle 140.

Handle 140 includes a contact portion 146 including two flats 148 and 150, located at different distances and orientations from center axis 152 of rivet 144. A transition 154, which may be a curve or one or more flats, may be located between flats 148 and 150. A shank washer 156 fits over the end of shaft 142 between a flange portion 158 of the shaft and contact portion 146 of handle 140. Once latch 100 is assembled, the two main functional positions of handle assembly 104 are defined by the shape and location of flats 148 and 150 with reference to contact with washer 156, as will be described below.

A disconnector 160 is attached to shaft 142 via a screw 162 or the like. Shaft 142 may have mating surfaces 164 for contacting cooperative surfaces 165 within disconnector 160 to prevent relative rotation once assembled.

Figure 9:
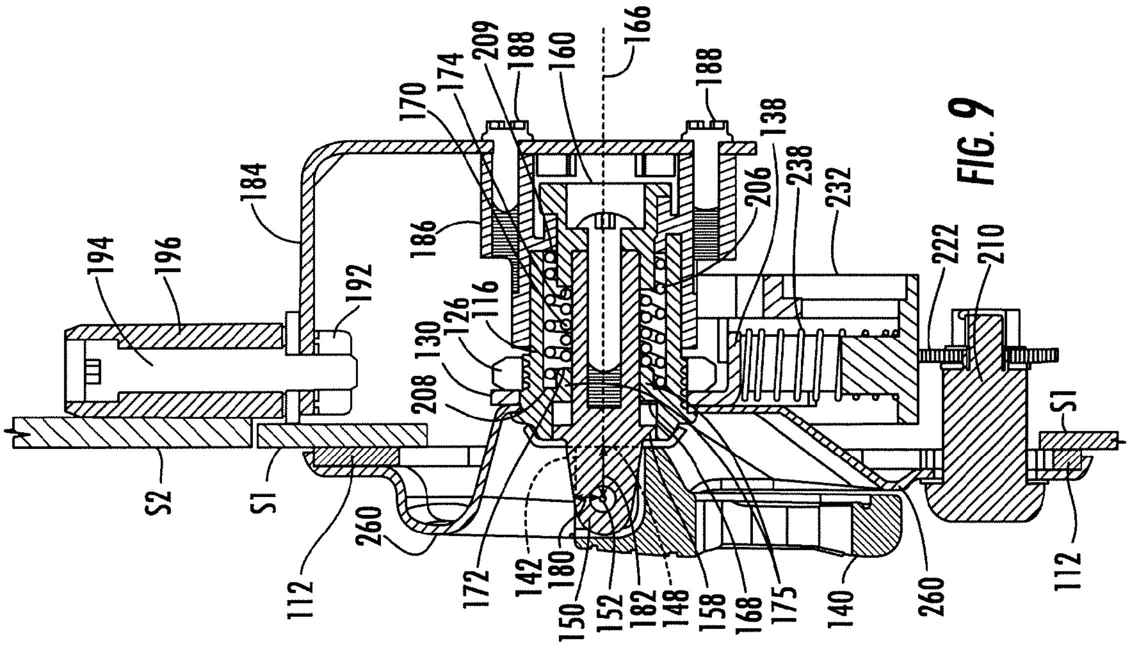
FIG. 9 is a cross-sectional view of the latch of FIG. 1 taken along line 9-9, with the locking device in an unlocked position, the handle in a first (folded) position, and the pawl in a latched, compressed position.

Handle assembly 104 is movable along a longitudinal axis 166 from the position shown in FIG. 9, toward the right as far as the distance between shaft flange portion 158 and first stop portion 168 of shank 116. A compression spring member 170 is mounted between second stop portion 172 of shank 116 and a stop portion 174 of disconnector 160. Compression spring member 170 urges handle assembly 104 to the right, as shown in FIG. 9. Compression spring member 170 should provide a force strong enough to hold handle 140 against washer 156 when handle assembly 104 is manipulated. A guide portion 175 of shank 116 maintains shaft 142 in alignment, allowing the shaft to slide along and rotate around axis 166. When handle 140 is pivoted from the first position shown in FIG. 9 to the second position shown in FIG. 10, contact between washer 156 changes from flat 148 to flat 150 under influence of spring member 170, thereby moving disconnector 160 away from the rear side 176 of tray 110, a distance 178, as distance 180 is less than distance 182.

Pawl assembly 108 includes a pawl arm 184 mounted to a rear shank 186 via screws 188 or the like. As illustrated, pawl arm 184 is adjustable and includes a friction reducing roller, although various other types of pawl designs could be employed. In particular, pawl arm 184 includes a cam arm 190, a slider 192, a partially threaded screw 194, a roller 196, and a washer 198. Threaded portion 200 of screw 194 is placed through slot 202 in arm 190 and tightened into threaded hole 204 in slider 192 in a desired position to adjust the screw/roller height to a desired level with reference to tray 110 and the enclosure.

Rear shank 186 fits partially over front shank 116, and disconnector 160 fits within the rear shank. A compression spring member 206 is disposed between a third stop portion 208 of front shank 116 and a stop portion 209 of rear shank 186. Therefore, compression spring member 206 urges the two shanks 116 and 186 apart, and urges rear shank 186 into contact with disconnector 160. The shanks 116, 186, the handle assembly 104, and the spring members 170, 206 should be assembled before pawl arm 184 is attached to the rear shank. Compression spring member 206 should provide a force strong enough to ensure that rear shank 186 can be moved against disconnector 160 when desired.

Locking device assembly 106 includes a lock device 210, such as a key cylinder. It should be understood that lock device 210 could comprise other such devices and mechanisms, such as a padlock controlled mechanism or the like. As illustrated lock device 210 may be mounted to tray 110 via a threaded nut 212 and gasket 214, as shown. Hole 216 and lock device 210 may have mating surfaces 218, 220 to prevent rotation once installed.

Figure 3:
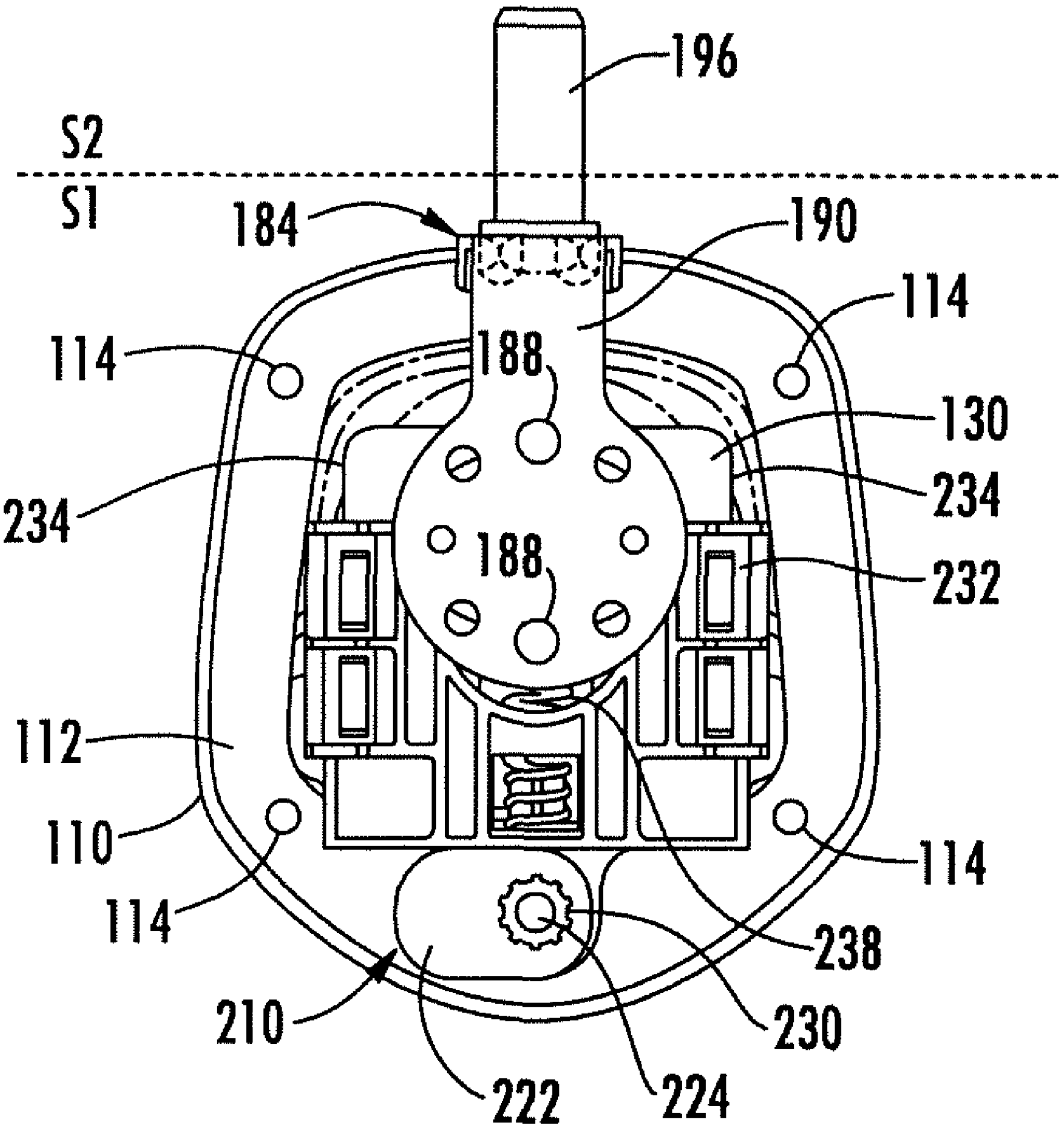
FIG. 3 is a rear view of the latch of FIG. 1
Figure 4:
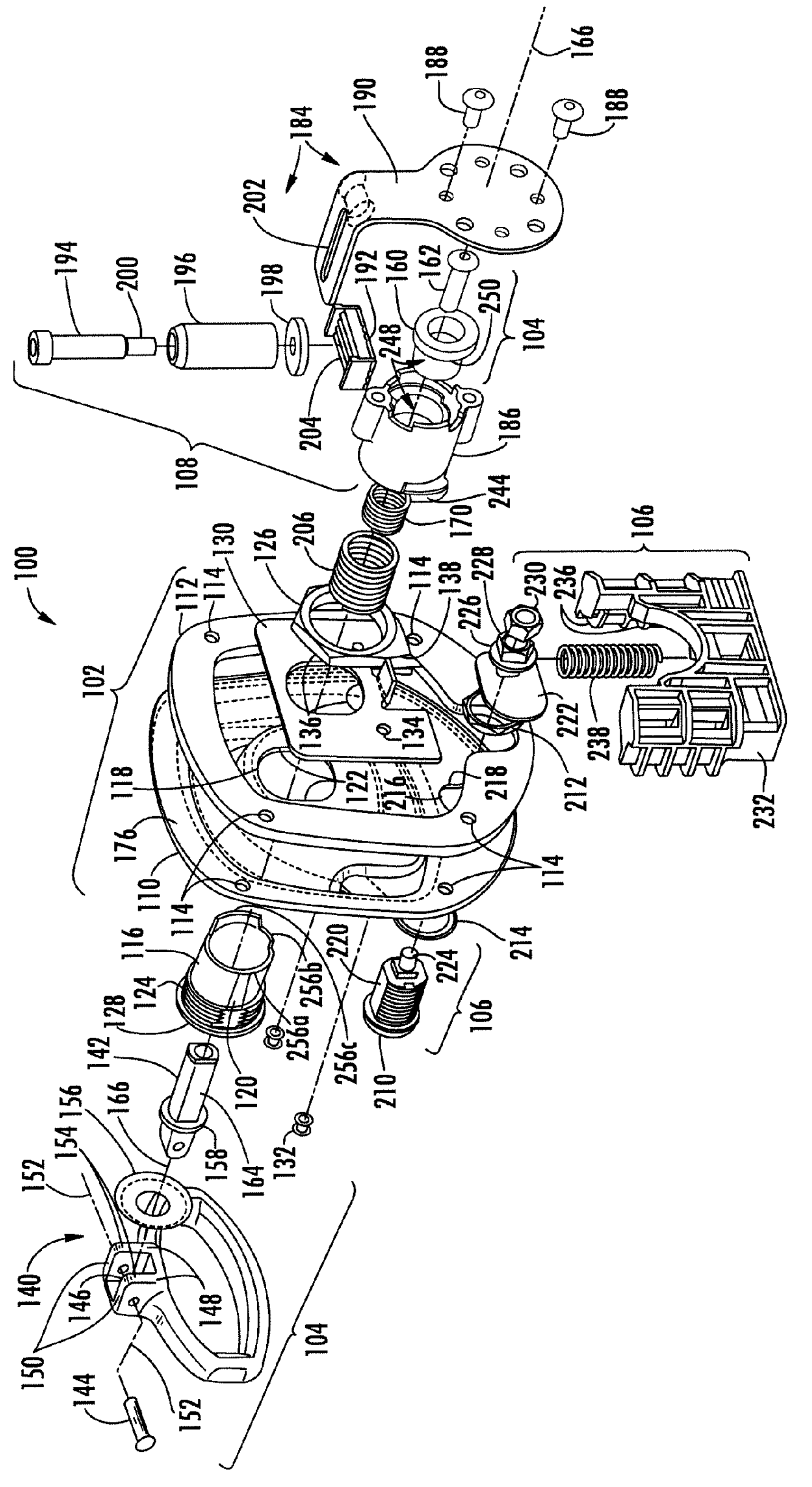
FIG. 4 is a rear perspective exploded view of the latch of FIG. 1.
Figure 5:
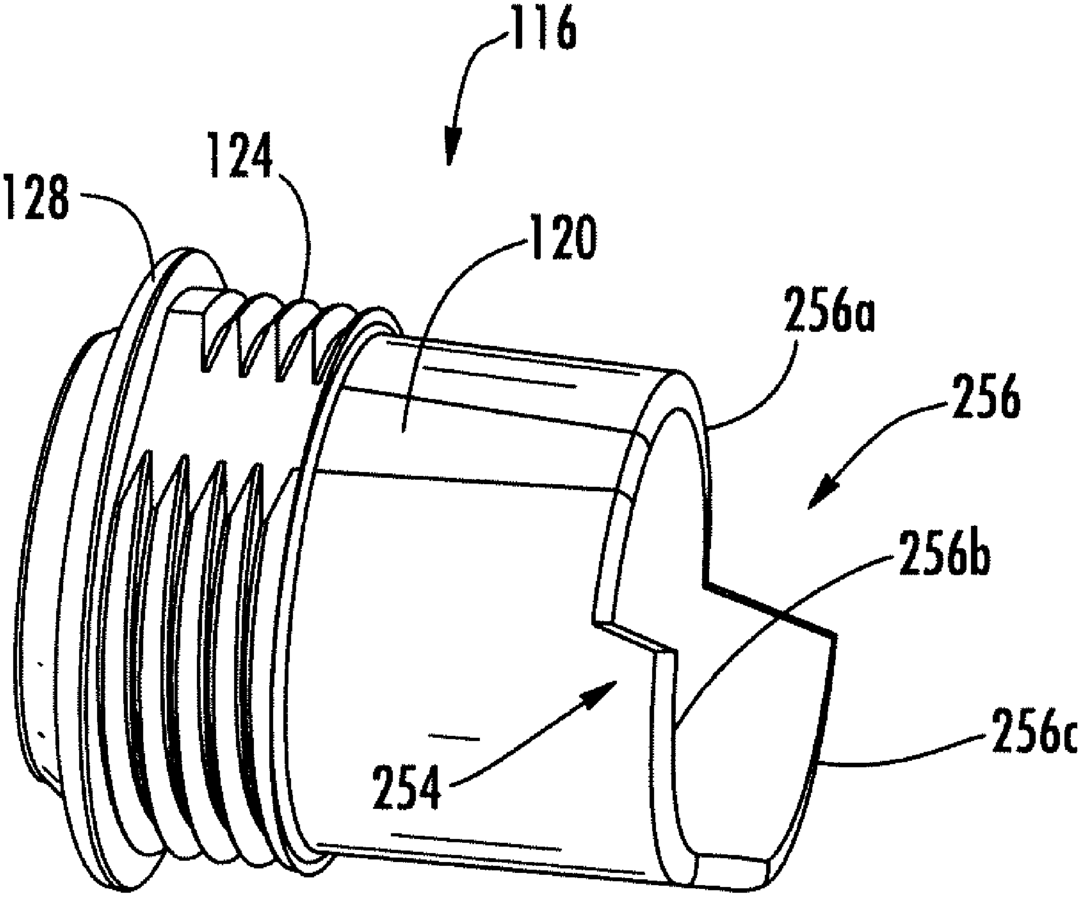
FIG. 5 is a perspective view of the front shank of the latch of FIG. 1.
Figure 6:
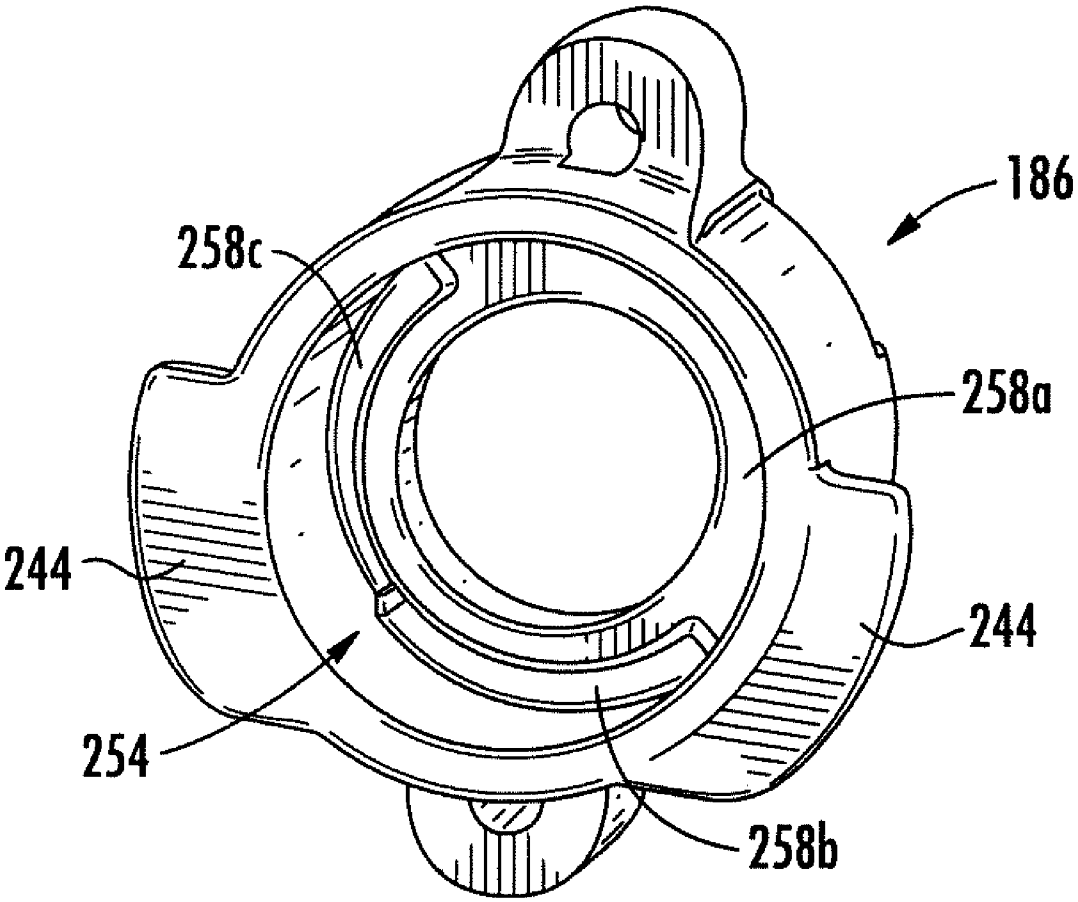
FIG. 6 is a perspective view of the front side of the rear shank of the latch of FIG. 1.
Figure 7:
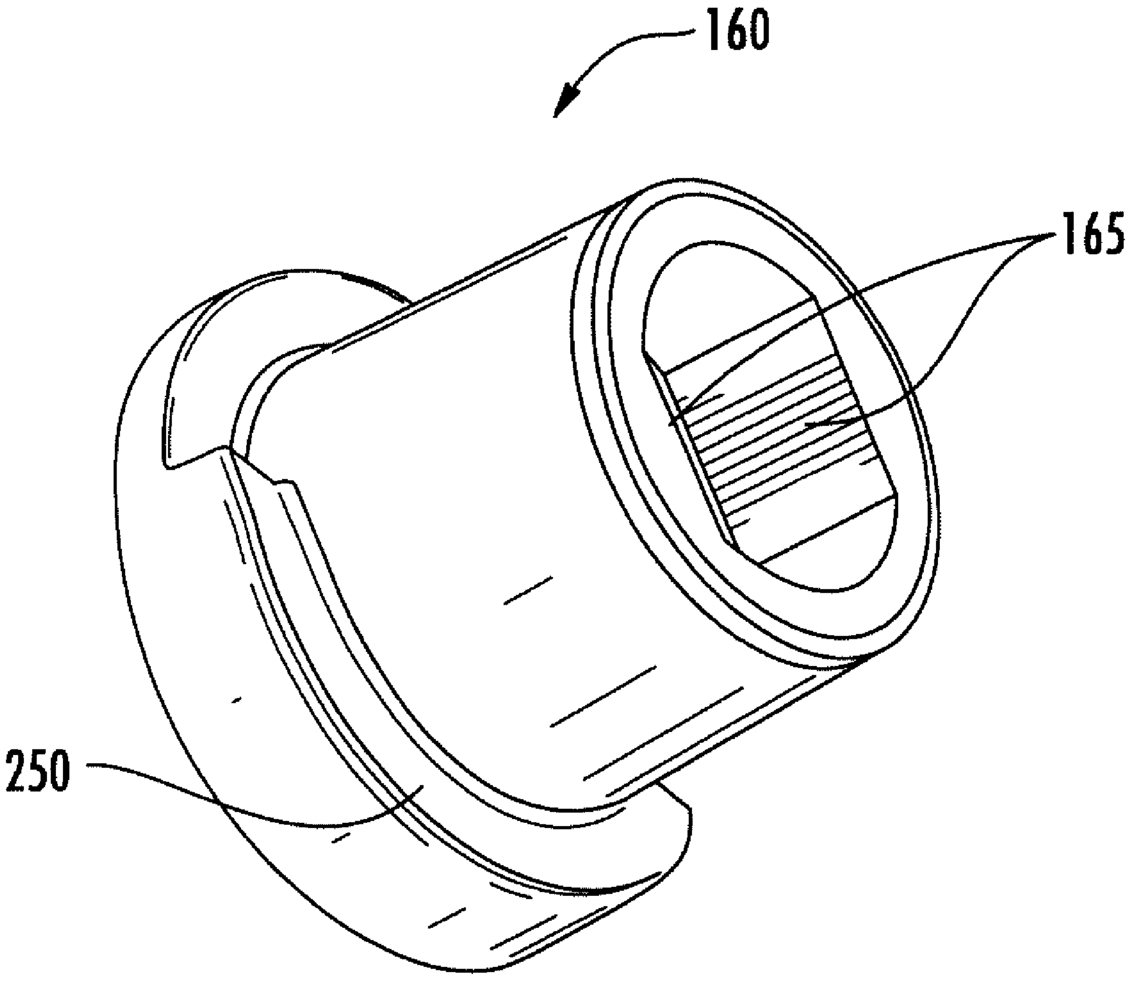
FIG. 7 is a perspective view of the disconnector of the latch of FIG. 1.
Figure 8:
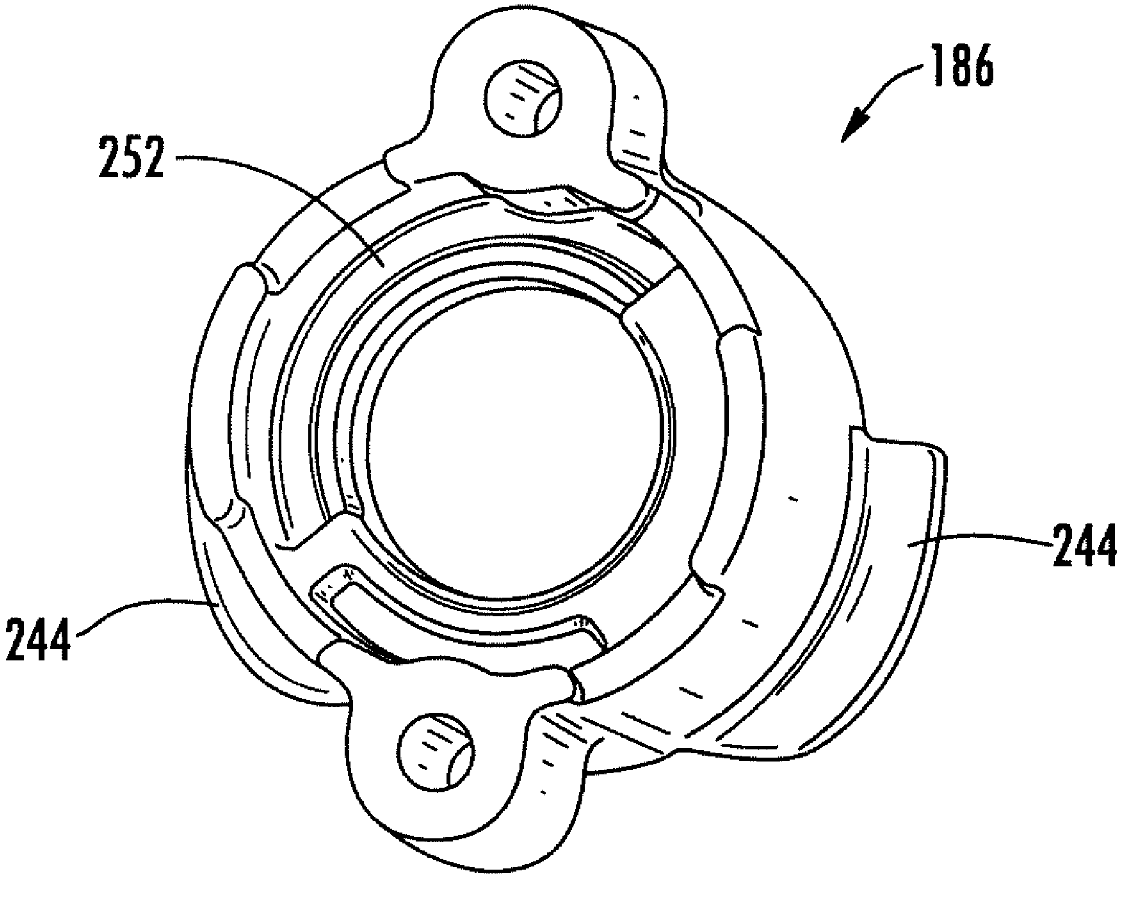
FIG. 8 is a perspective view of the rear side of the rear shank of the latch of FIG. 1.
Figure 12:
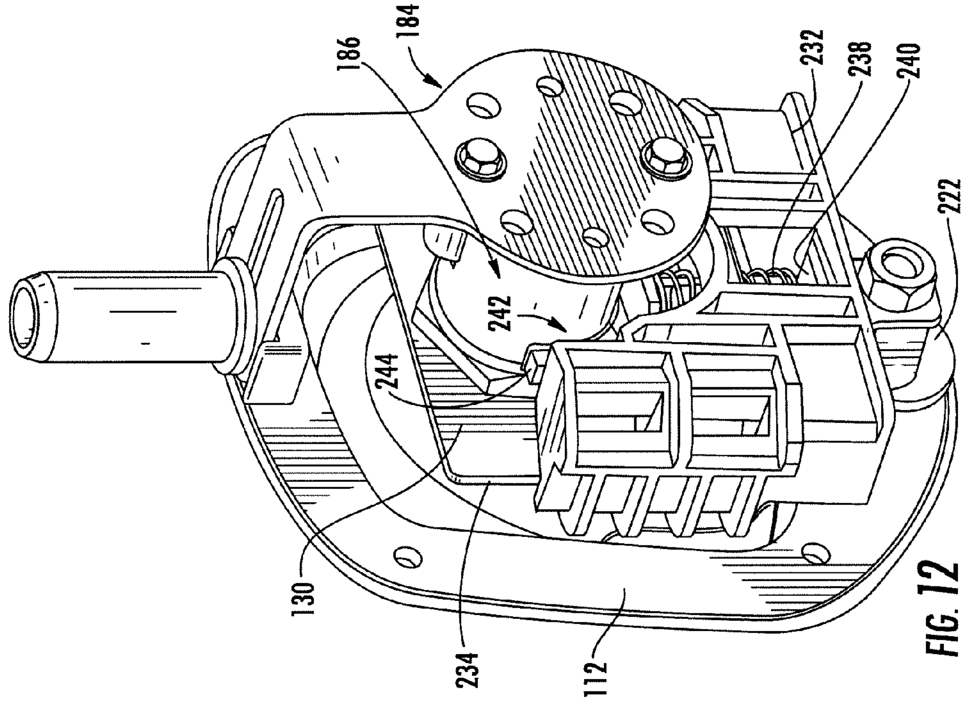
FIG. 12 is a rear perspective view of the latch of FIG. 1, showing the locking device and locking bar in an unlocked position.

A locking cam 222 is attached to a rear drive portion 224 of locking device 210. Cam 222 may be secured by an orienting washer 226, a lock washer 228 and a lock nut 230, or other structure. As shown in FIGS. 3 and 12, lock device 210 and cam 222 are in an unlocked position. Locking bar 232 is slidably mounted to the rear of tray 110 via edges 234 of locking bar plate 130. Tabs 236 hold locking bar 232 on plate 130 (see FIG. 2) positioned between locking cam 222 and shanks 116, 186. A compression spring member 238 is disposed between tab 138 of locking bar plate 130 and stop portion 240 of locking bar 232 to urge the locking bar downward (as shown in FIG. 9). Rotation of locking device 210 from the unlocked position shown in FIGS. 9 and 12 to the locked position shown in FIGS. 13 and 14 causes locking bar 232 to be moved upward.

Figure 15:
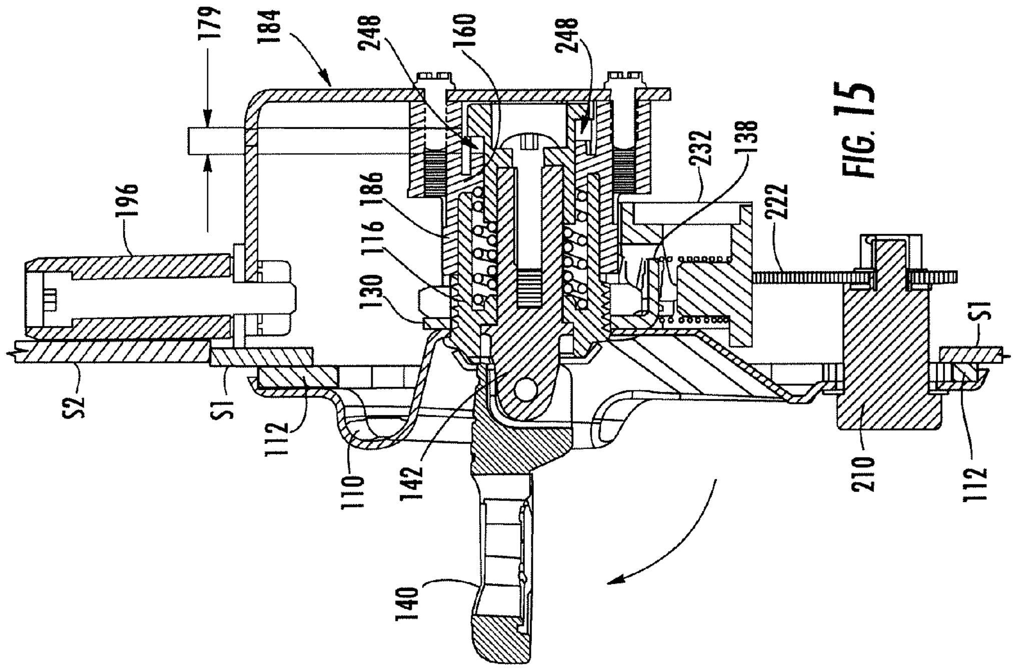
FIG. 15 is a cross-sectional view of the latch as in FIG. 14, with the handle further moved to the second (unfolded) position, and the pawl in a compressed disconnected position.

A locking interface 242 is provided between the locking bar 232 and the rear shank 186 of pawl assembly 108. As illustrated, locking interface comprises arms 244 extending from rear shank 186 and corresponding slots 246 located in locking bar 232. When locking bar 232 is slid upwardly by cam 222, arms 244 fit within slots 246, thereby preventing rotation of rear shank 186 about axis 166, and also preventing the rear shank from sliding axially away from the rear 176 of tray 110. Therefore, as shown in FIG. 15, even if handle 140 is lifted, thereby sliding shaft portion 142 and disconnector 160 of handle assembly 104 to the right, rear shank 186 and pawl assembly 108 stays put, thereby maintaining closing compression between surfaces S1 and S2. It should be understood that other locations and configurations of locking interface 242 are possible, so long as motion of pawl assembly 108 is precluded when the locking device 210 is in the locked position.

A pawl drive interface 248 is provided on the handle assembly 104 (in this case disconnector 160) and the pawl assembly 108 (in this case rear shank 186). Pawl drive interface 248 may comprise mating stepped portions 250, 252 of disconnector 160 and rear shank 186. When pawl drive interface 248 is in a drive position and the locking device 210 is in the unlocked position (see FIG. 10), pawl assembly 108 is drivable via handle assembly 104. When pawl drive interface 248 is in a disconnected position (see FIG. 15), handle assembly 104 rotates unrestricted around axis 166, but pawl assembly 108 does not move, thereby keeping the compartment closed and maintaining closure compression.

Figure 14:
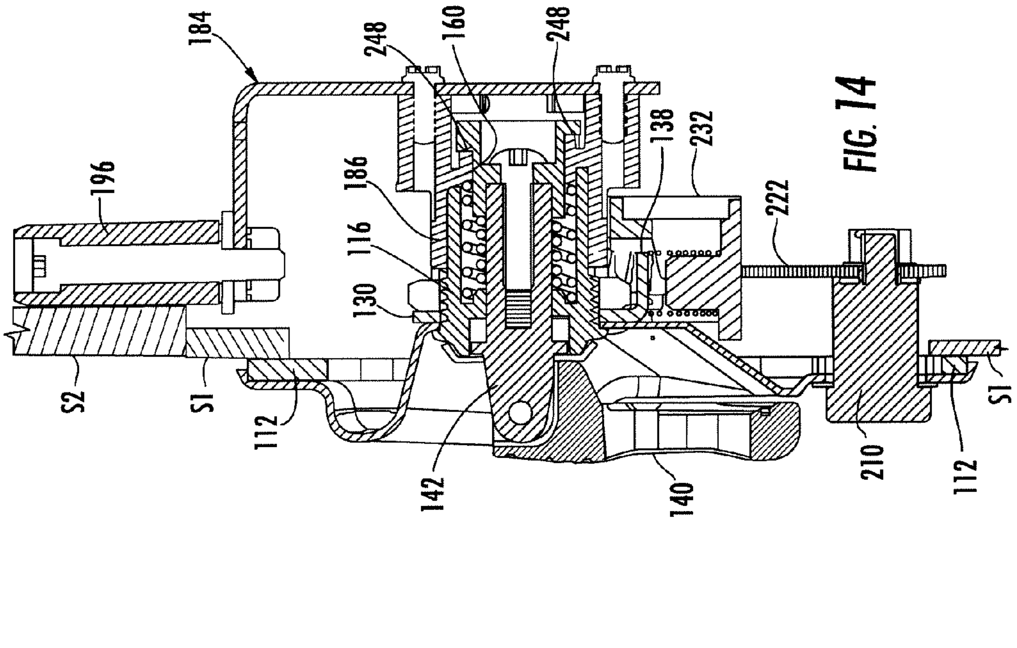
FIG. 14 is a cross sectional view of the latch as in FIG. 9, with the locking device in a locked position, the handle in a first (folded) position) and the pawl in a latched, compressed position.

A stop interface 254 is disposed on the pawl assembly 108 (in this case rear shank 186) and the tray assembly 102 (in this case front shank 116) for preventing rotation of pawl assembly 108 when the handle assembly 104 is not in the second position (see FIGS. 9 and 14). As above, stop interface 254 may comprise mating step portions 256, 258 that allow rotation of rear shank 186 upon sufficient separation from front shank 116. Therefore, even if locking device assembly 106 is unlocked, unless handle 140 is lifted to the second position of FIG. 10, then pawl assembly 108 cannot rotate relative to shaft 142. By unlocking locking device assembly 106 and moving handle 140 to the second position, shaft 142 slides to the right due to spring member 170, allowing rear shank 186 to simultaneously move to the right due to spring member 206.

If desired, mating step portions 256, 258 of stop interface 254 can be formed with three levels 256*a-c* and 258*a-c*, thereby forming two "steps." When stop interface 254 of shanks 116 and 186 are in the full stop position (see FIGS. 9 and 14), portions 256*a* and 258*a* are in contact, portions 256*b* and 258*b* are in contact, and portions 256*c* and 258*c* are in contact. No relative rotational motion is possible between shanks 116 and 186. When handle 140 is moved to the position shown in FIG. 10, the locking device 232 being unlocked, rear shank 186 moves axially away from shank by a distance at least as great as the depth between the "a and b" steps and the "b and c" steps. At this point, shaft 142 may be rotated with step 258*a* moving over step 256*b* and step 258*b* moving over step 256*c*. Rotation can continue for the radial extent of step 256*b*, at which point a hard stop is reached when the axial wall between steps 258*a* and 258*b* contacts the axial wall between steps 256*b* and 256*c*. Thus, relative rotational movement is allowed, with a hard stop at a desired rotation amount, such as 90 or 180 degrees, and in a direction either clockwise, counterclockwise, or both ways. As shown, 90 degree rotation of handle assembly 104 in the clockwise direction is permitted when handle 142 is folded up. If desired, the hard stop feature can be eliminated allowing for 460 degree rotation once handle 142 is folded up, by making stop interface 254 have only two steps.

If desired, as a matter of design choice, stepped portions 250, 252 of pawl drive interface 248 can be formed with two steps as well, although such does provide less of a disconnect function than allowing free 360 rotation when in the disconnect position. Also, if less than 360 degree rotation of handle shaft 142 is desired when the pawl assembly 108 is in a disconnected (locked) orientation, a different stop interface could be provided between handle assembly 104 (such as shaft 142) and tray assembly 102 (such as front shank 116) or locking device assembly 106 (such as locking bar 232), instead of using a two-stepped interface between disconnector 160 and rear shank 186.

It may be desirable to make the depth of the stepped portions 250, 252 on the drive interface 248 axially smaller than the difference between step portions 256*a*/258*a* and 256*b*/258*b* of stop interface 254, so that the handle assembly disconnect function is actuated before the handle assembly 104 becomes rotatable. In other words, as the handle 140 is pivoted upwards while the device is unlocked, the handle shaft 142 will move axially and cause the disconnector 160 to disconnect from rear shank 186 at the drive interface 248 before stop interface 254 is moved to a position allowing any rotation of the handle shaft 142. Also, the configuration of flats 148 and 150 and transition 154 of handle 140 can be designed for a desired effect on the axial location shaft 142 during the travel of handle when pivoted upwardly. Such spacing may provide further deterrent to impermissible opening of latch 100 through damage to handle 140, etc., by folding the handle out and then forcing it with a crowbar or the like to bend or break internal parts of latch related to the lock or opening functions. By causing the disconnect function to occur upon somewhat slight movement pivoting of handle 140, the possibility of damage in such situation is lessened. Also, for additional security ridge 260 of tray 110 can be formed so as to surround handle 140 (so that handle 140 sits within the ridge on front side 262 of the tray), whereby the disconnect function can occur before 140 handle is lifted out far enough to be able to get at it with a crowbar or other implement.

Figure 1:
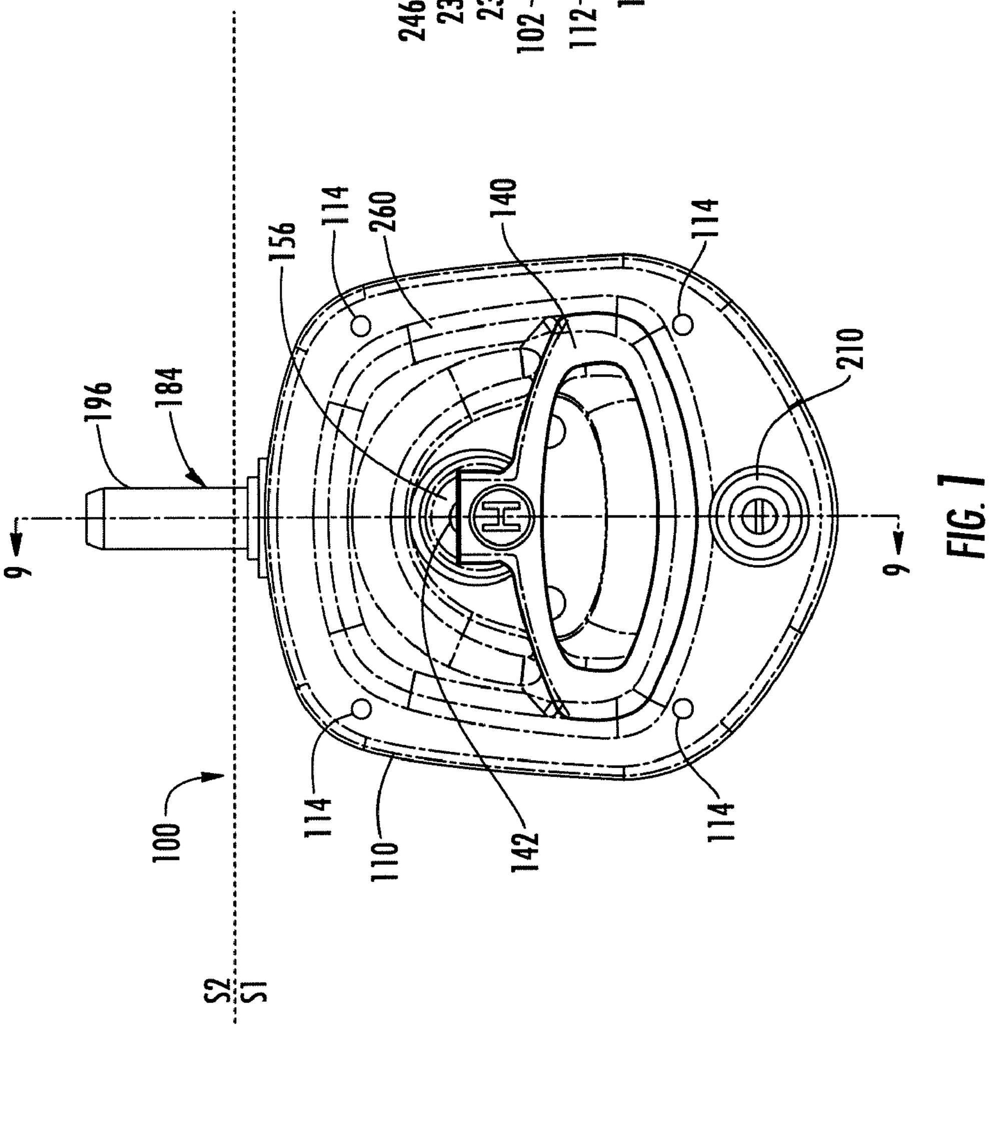
FIG. 1 is a front view of a rotary actuation latch according to certain aspects of the invention.
Figure 10:
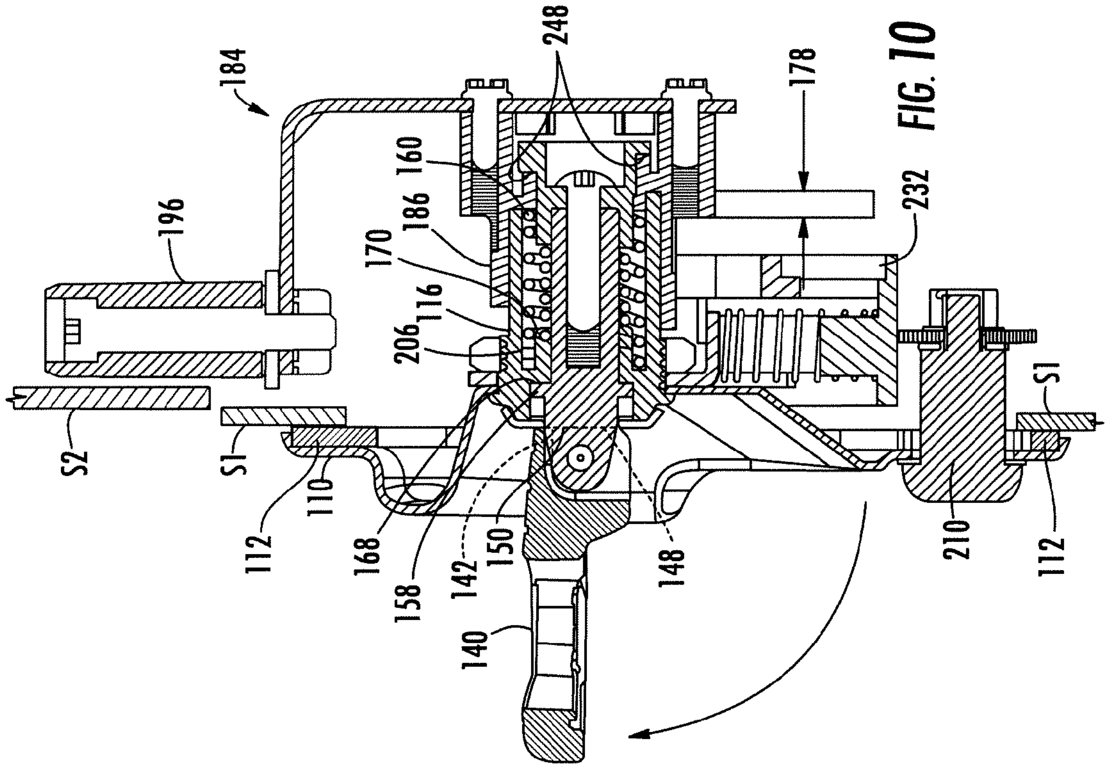
FIG. 10 is a cross-sectional view of the latch as in FIG. 9, with the handle further moved to the second (unfolded) position, and the pawl in an uncompressed drive position.

To operate the latch 100, from the unlocked position shown in FIGS. 1 and 9, handle 140 is first swung upward from the position of FIG. 9 to that of FIG. 10. Contact with washer 156 changes from flat 148 to flat 150, with the net result that shaft 142 moves to from the first position to the second position (to the right as shown) under the influence of spring 170 (see distance 178). Spring 206 simultaneously moves rear shank 186 and entire pawl arm 184 rearward by distance 178 as well. At this point, compression has been released between pawl arm 184 and surface S2. The drive interface 248 is in the drive position, the locking interface is in an unlocked position and the stop interface is in a rotatable position.

Figure 11:
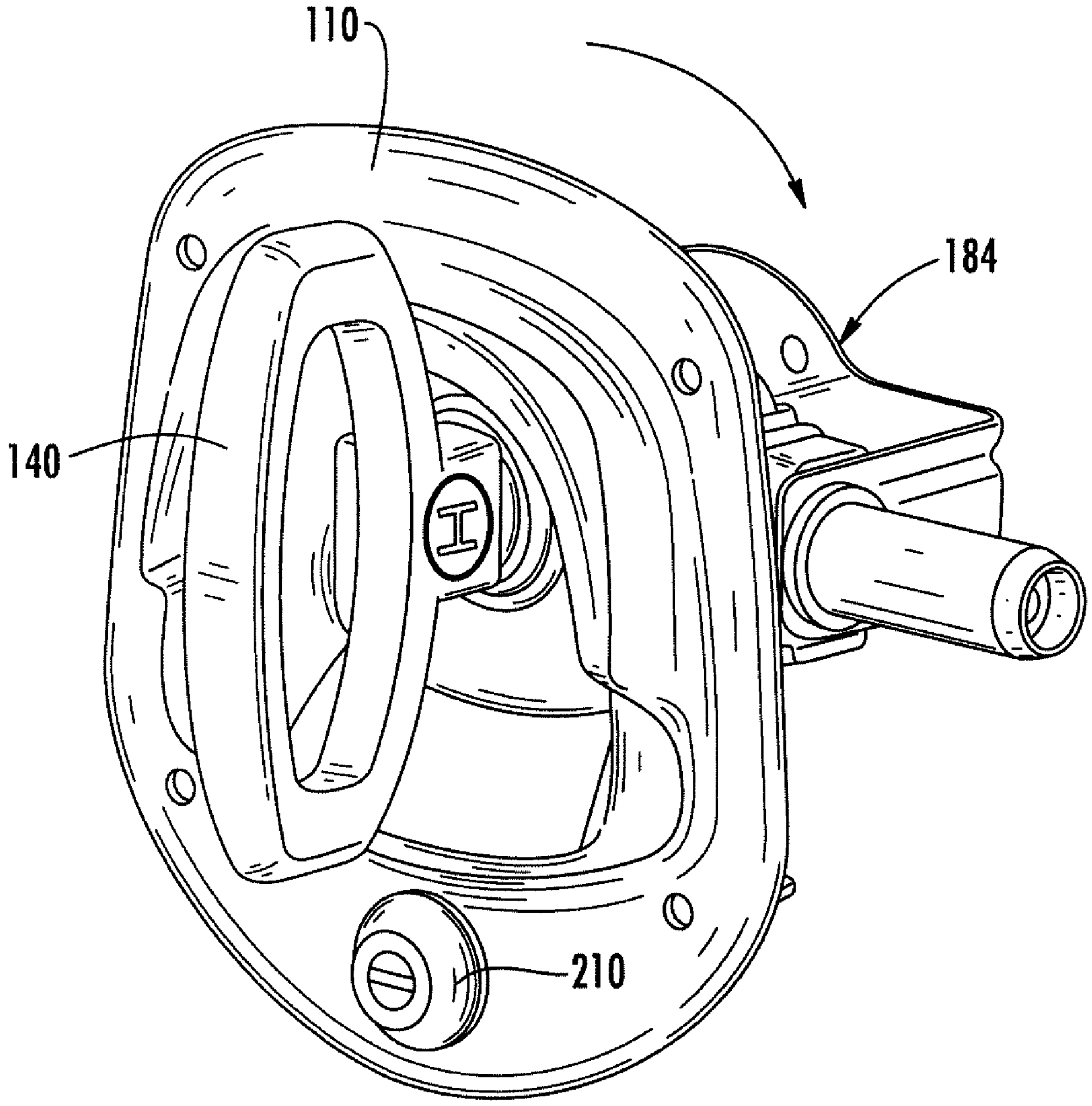
FIG. 11 is a front perspective view of the latch as in FIG. 10, with the handle and pawl further rotated ninety degrees from the position of FIG. 10, thereby putting the pawl in an unlatched position.

Handle assembly 104 can thus be rotated to the position shown in FIG. 11 (to the extent allowed by the second steps 256*b*, 258*b*, if present in stop interface), thereby moving pawl assembly 108 to an unlatched position and allowing the door to be opened. The handle assembly 104 may thus be rotated as desired between an uncompressed latched position (FIG. 10) and an unlatched position (FIG. 11).

Figure 13:
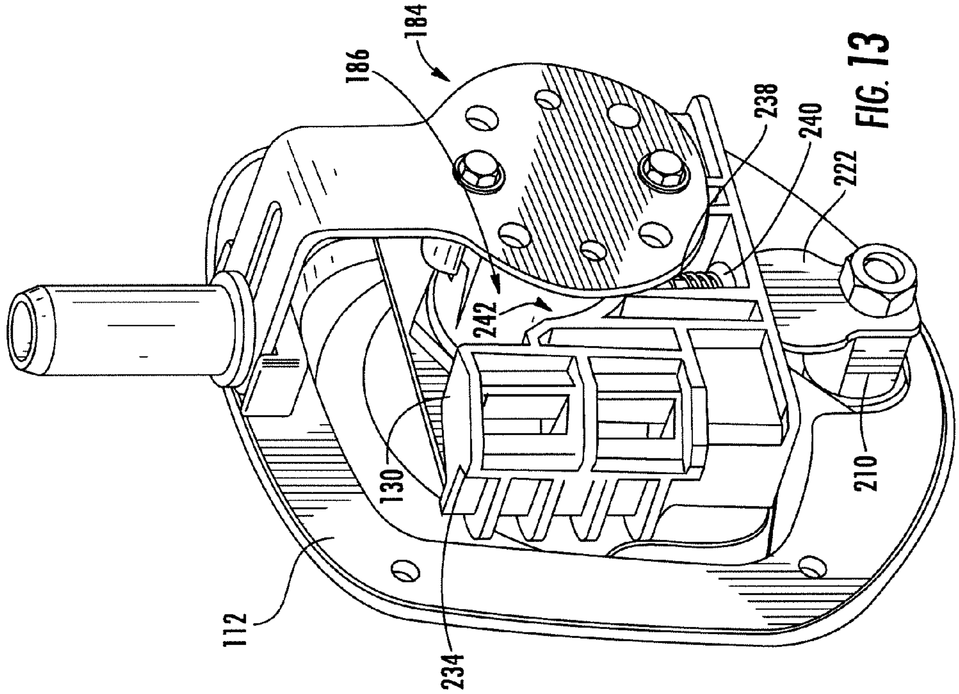
FIG. 13 is a rear perspective view as in FIG. 12, with the locking device and locking bar moved to a locked position.

The latch 100 may be locked by returning handle assembly 104 to the latched position (FIG. 10) and then folding handle 140 back down (FIG. 9). Locking device 210 can be locked via the key or whatever other method employed, to slide locking bar 232 from the unlocked position (FIG. 12) to the locked position (FIGS. 13 and 14). At this point, arms 244 of rear shank 186 are located within slots 246 of locking bar 232 and steps 256 or front shank 116 are fully engaged within steps 258 of rear shank 186. Pawl arm 184 is in the forward position maintaining compression against surface S2.

If handle 140 is pivoted upward from the position of FIG. 14 to the position of FIG. 15, only handle assembly 104 moves, as locking device assembly 106 keeps pawl assembly 108 from moving or releasing compression. Disconnector 160 is moved along axis 166 by distance 179, which is greater than the depth of steps 250 and 252, thereby moving drive interface 248 to the disconnected position. At this point, handle assembly 104 may be freely rotated around axis 166 while all other elements are undisturbed, thereby providing a secure disconnect function.

If the locking device 210 is unlocked at this point, locking bar 232 will move downward due to spring 238, and then front shank 116 will be slid rearward by spring 206, thereby moving stop interface 254 to a rotatable (partially rotatable) position, and moving the drive interface elements (186 and 160) into contact with each other. If steps 250 and 252 are not initially aligned to allow pawl assembly 108 to be driven, further rotation of handle 140 and disconnector 160 will cause steps 250 and 252 to eventually become aligned, thereby moving the drive interface to the drive position of FIG. 10.

If latch 100 is in the position of FIG. 10 and a user attempts to move locking device 210 to the locked position using a key for example, arms 244 of rear shank 186 will not be aligned with slots 246 of locking bar 232. Spring 238 will be compressed by rotation of cam 222 and locking bar 232 will move up partially toward the locking position. If handle 140 is then pivoted down to the position of FIG. 9, disconnector 160 and pawl arm 184 will move toward tray 110. Arms 244 of rear shank 186 will slide along locking bar 232 until they reach slots 246. At that point, arms 244 will enter slots 246 of locking bar 232 and the locking bar will move upward to the locked position as shown in FIG. 14.

Therefore, latch 100 provides a rotary latching mechanism suitable for use with various types of rotary handles beyond those described above. Latch 100 includes compression features, although several of the concepts above can be applied to non-compression style rotary operated latches. Latch 100 also provides a disconnect function which can be applied to various other latches. Use of the compression and disconnect features together provides numerous advantages, although such features may be employed separately if desired.

Latch 100 may be economically manufactured of conventional metals and plastics. In particular, it may be advantageous to mold various elements (such as the locking bar, rear shank, and/or disconnector, etc) of plastics to reduce weight and cost, because the disconnect feature prevents their being subject to high stresses.

It should be understood that the foregoing description provides only exemplary embodiments and discussion of examples of the invention. Various modifications and options are possible. Accordingly, set forth below are claims covering certain aspects of the invention; however, a full scope of the invention is to be ascertained from the claims, their equivalents, and the full contents of this application.

What is claimed is:

1. A rotary actuation latch with disconnect feature, the latch comprising:

a tray for attachment to one of a door or a frame, the tray having a front side and a rear side;

a rotary member rotatably mounted to and extending through the tray, the rotary member being movable along a longitudinal axis relative to the tray between a first position and a second position;

a pawl disposed on the rear side of the tray for engaging the other of the door or the frame for securing the door in a closed position, the pawl having a drive interface disposable in either of a drive position or a disconnect position relative to the rotary member, the pawl being rotatable via the rotary member when the drive interface is in the drive position; and a locking device attached to the tray and movable between a locked position and an unlocked position, the locking device when in the locked position preventing the pawl drive interface from being disposable in the drive position while not preventing the rotary member from moving along the longitudinal axis between the first and second positions.

2. The latch of claim 1, wherein the pawl is movable along the longitudinal axis when the pawl drive interface moves between the drive position and the disconnect position.

3. The latch of claim 2, wherein the pawl is spaced further from the rear side of the tray when the pawl drive interface is in the drive position as compared to the disconnect position.

4. The latch of claim 3, further including a compression spring member disposed between the tray and the pawl for urging the pawl drive interface toward the drive position.

5. The latch of claim 4, wherein the rotary member includes a shaft and a disconnector attached to the shaft, the disconnector including a drive interface for selectively engaging the drive interface of the pawl to rotate the pawl when the rotary member is disposed in the second position if the pawl drive interface is in the drive position.

6. The latch of claim 5, wherein the compression spring member comprises a first compression spring member, the latch further including a second compression spring member disposed between the tray and the disconnector for urging the disconnector away from the rear side of the tray.

7. The latch of claim 1, further including a handle pivotally mounted to the rotary member on the front side of the tray, the handle movable between a first position and a second position to thereby move rotary member along the longitudinal axis between its respective first and second positions, the rotary member being rotatable via the handle when the handle is in the second position.

8. The latch of claim 7, wherein the pawl includes a stop interface for preventing rotation of the pawl when the handle is not in the second position.

9. The latch of claim 8, further including a stop interface attached to the tray for selectively engaging the stop interface on the pawl when the handle is not in the second position.

10. The latch of claim 1, wherein the locking device includes a locking cylinder and a locking bar, the locking cylinder selectively positioning the locking bar between a locked position and an unlocked position.

11. The latch of claim 10, wherein the locking bar has a lock interface for preventing movement of the pawl drive interface from the disconnect position to the drive position when the locking bar is in the locked position.

12. The latch of claim 11, wherein the pawl has a lock interface for selective engagement by the locking bar lock interface.

13. The latch of claim 1, wherein the rotary member and the pawl are configured to function as a compression latch.

14. The latch of claim 13, wherein the pawl drive interface is movable along the longitudinal axis between the drive position and the disconnect position, and wherein the pawl drive interface is spaced further from the rear side of the tray when in the drive position as compared to the disconnect position, a compression spring member being disposed between the tray and the pawl for urging the pawl drive interface toward the drive position.

15. The latch of claim 14, further including a handle pivotally mounted to the rotary member on the front side of the tray, the handle movable between a first position and a second position to thereby move rotary member along the longitudinal axis between its respective first and second positions, the rotary member being rotatable via the handle when the handle is in the second position.

16. A rotary actuation latch with disconnect feature, the latch comprising:

a tray for attachment to one of a door or a frame, the tray having a front side and a rear side;

a handle assembly rotatably mounted to and extending through the tray, the handle assembly being movable along a longitudinal axis relative to the tray between a first position and a second position;

a pawl disposed on the rear side of the tray for engaging the other of the door or the frame for securing the door in a closed position, the pawl being selectively connectable or disconnectable for rotation via the handle assembly; and a locking device attached to the tray and movable between a locked position and an unlocked position, the locking device when in the locked position disconnecting the pawl from rotation via the handle assembly while not preventing the handle assembly from moving along the longitudinal axis between the first and second positions or from rotating around the longitudinal axis when in the second position.

17. The latch of claim 16, wherein the pawl is movable along the longitudinal axis for the selective connection or disconnection for rotation via the handle assembly, a compression spring member disposed between the tray and the pawl urging the pawl toward the selective connection.

18. The latch of claim 17, wherein the locking device when in the locked position prevents the pawl from moving toward the selective connection to thereby disconnect the pawl from rotation via the handle assembly.

19. The latch of claim 16, wherein the handle assembly, the pawl, and the tray are configured so that the handle assembly can not rotate around the longitudinal axis when the handle assembly is in the first position.

20. A rotary actuation compression latch with disconnect feature, the latch comprising:

a tray for attachment to one of a door or a frame, the tray having a front side and a rear side;

a handle assembly rotatably mounted to and extending through the tray, the handle assembly being movable along a longitudinal axis relative to the tray between a first position and a second position;

a pawl disposed on the rear side of the tray for engaging the other of the door or the frame for securing the door in a closed position, the pawl being rotatable via the handle assembly between a latched and an unlatched position, the handle assembly and pawl cooperating to provide a compression latching function along the longitudinal axis;

a locking device attached to the tray and movable between a locked position and an unlocked position; and means for disconnecting the pawl from rotation via the handle assembly while maintaining the compression latching function when the locking device is in the locked position while not preventing the handle assembly from moving along the longitudinal axis between the first and second positions.

21. The latch of claim 20, wherein the means for disconnecting includes a locking interface disposed on the locking device and the pawl for preventing the pawl from rotating with the handle assembly when the locking device is in the locked position.

22. The latch of claim 21, wherein the pawl is movable along the longitudinal axis, and the locking interface precludes movement of the pawl along the longitudinal axis when the locking device is in the locked position.

23. The latch of claim 20, where the means for disconnecting includes a drive interface disposed on the pawl and the handle assembly engageable when the handle assembly in the second position and the locking device is in the unlocked position to thereby allow rotation of the pawl via the handle assembly.

24. The latch of claim 23, further including a stop interface on the pawl and attached to the tray for precluding rotation of the handle assembly when the handle assembly is in the first position.

* * * * *